(12) United States Patent
Dhayanithi

(10) Patent No.: US 11,222,037 B2
(45) Date of Patent: Jan. 11, 2022

(54) INTELLIGENT MESSAGE MAPPING

(71) Applicant: SAP SE, Walldorf (DE)

(72) Inventor: VishnuPrasath Dhayanithi, Bangalore (IN)

(73) Assignee: SAP SE, Walldorf (DE)

( * ) Notice: Subject to any disclaimer, the term of this patent is extended or adjusted under 35 U.S.C. 154(b) by 212 days.

(21) Appl. No.: 16/453,209

(22) Filed: Jun. 26, 2019

(65) Prior Publication Data

US 2020/0409970 A1    Dec. 31, 2020

(51) Int. Cl.
*G06F 16/00* (2019.01)
*G06F 16/25* (2019.01)
*G06F 16/21* (2019.01)
*G06F 16/245* (2019.01)

(52) U.S. Cl.
CPC .......... *G06F 16/258* (2019.01); *G06F 16/212* (2019.01); *G06F 16/245* (2019.01)

(58) Field of Classification Search
CPC ..... G06F 16/258; G06F 16/245; G06F 16/212
See application file for complete search history.

(56) References Cited

U.S. PATENT DOCUMENTS

| | | | | |
|---|---|---|---|---|
| 2012/0011487 A1* | 1/2012 | Matsumoto | ......... | G06F 11/3608 717/104 |
| 2012/0265726 A1* | 10/2012 | Padmanabhan | ....... | G06F 16/214 707/602 |
| 2015/0081672 A1* | 3/2015 | Wolf | ................. | G06F 16/24568 707/722 |
| 2015/0339359 A1* | 11/2015 | Takaoka | ................ | G06F 16/211 707/602 |
| 2017/0004167 A1* | 1/2017 | Bauer | ................. | G06F 16/2365 |
| 2017/0052970 A1* | 2/2017 | Crabtree | ............. | G06F 16/2379 |
| 2019/0005228 A1* | 1/2019 | Singh | ..................... | G06F 21/53 |

* cited by examiner

*Primary Examiner* — Tarek Chbouki
(74) *Attorney, Agent, or Firm* — Buckley, Maschoff & Talwalkar LLC

(57) ABSTRACT

A method and system include a source endpoint and a target endpoint; a mapping module; and a mapping processor in communication with the mapping module and operative to execute processor-executable process steps. An input data is received including one or more payload data values and a payload schema data. An expected target data is received. The expected target data includes one or more expected target payload values and one or more expected target schema. The expected target data are in a form receivable by the target endpoint. One or more fields of payload data values are identified in the input data for transformation. At least one function is identified to transform the input data into the expected target data. The identified at least one function and input data form an expression step. The expression step is received at a first interface. The expression step is executed in the first interface to generate a generated output in the first interface. It is determined whether the generated output matches the expected target data. An indication of the match is provided to at least one of a user interface and another system. Numerous other aspects are provided.

18 Claims, 7 Drawing Sheets

INTELLIGENT MESSAGE MAPPING

BACKGROUND

Cloud integration is the act of combining different cloud-based systems into an integral whole, or may refer to the joining of cloud-based systems with on-premises systems. The ultimate goal of cloud integration is to connect the disparate elements of various cloud and local resources into a single, ubiquitous environment that allows administrators to seamlessly access and manage applications, data, services and systems.

With cloud computing, organizations may use a wide assortment of highly scalable resources and services on demand instead of constructing and maintaining them in-house. However, it may be challenging for the organization to manage and maintain each different cloud resource or dataset. Cloud integration avoids the organization administrators from having to perform each integration task separately and manually.

A cloud integration platform may synchronize data and applications across an enterprise. Cloud integration may include data integration (sharing or synchronizing data between data stores) and application integration (two or more applications share states, requests, commands and other mechanisms to implement organization processes). In the cloud integration platform, an integration developer may develop integration scenarios whereby, an application's or data's specific format is translated or converted to a format readable by the receiving application before it can be exchanged with the receiving application. With this translation/conversion process, the integration developer ("developer") typically defines all of the rules to translate/convert ("integrate") every field in a data source. While there are a set of standard functions available to facilitate the integration, it may be quite complex for the developer to define all the rules without the help of documentation and a help guide. Further, even with documentation (e.g., blogs, how-to documents, etc.) and the help guide, the manual integration is highly time consuming and error prone. For example, the documentation and help guides may be incomplete or weak with some content which is either simple or completely different from the developer's present task.

To address these errors, developers may use simulation and tracing whereby a message passing task is simulated, and the execution of this task is traced. Tracing may help the developer determine any errors or bugs with the integration. It is noted that tracing may be for an actual message passing task or a dummy scenario. However, simulation and tracing may still be problematic. Conventional simulation processes are based on a complete payload (e.g., the translation of an entire data source is completed before the simulation can be performed), and simulation is conventionally only used in testing, but not development. Conventional tracing processes provide information about every value being converted. However, simulating a complete scenario is not practical as it takes a lot of time for the inegration developer to get the scenario to a simulate-able state. This results in a large amount of tracing information, which may be very difficult to process. Further, with conventional tracing processes, re-execution of the simulation is required when the developer wants to get information at a different step/activity, and results in the developer losing the context about the previous step/activity.

Systems and methods are desired which support efficient integration of a data source with a data target.

DETAILED DESCRIPTION

Figure 1:
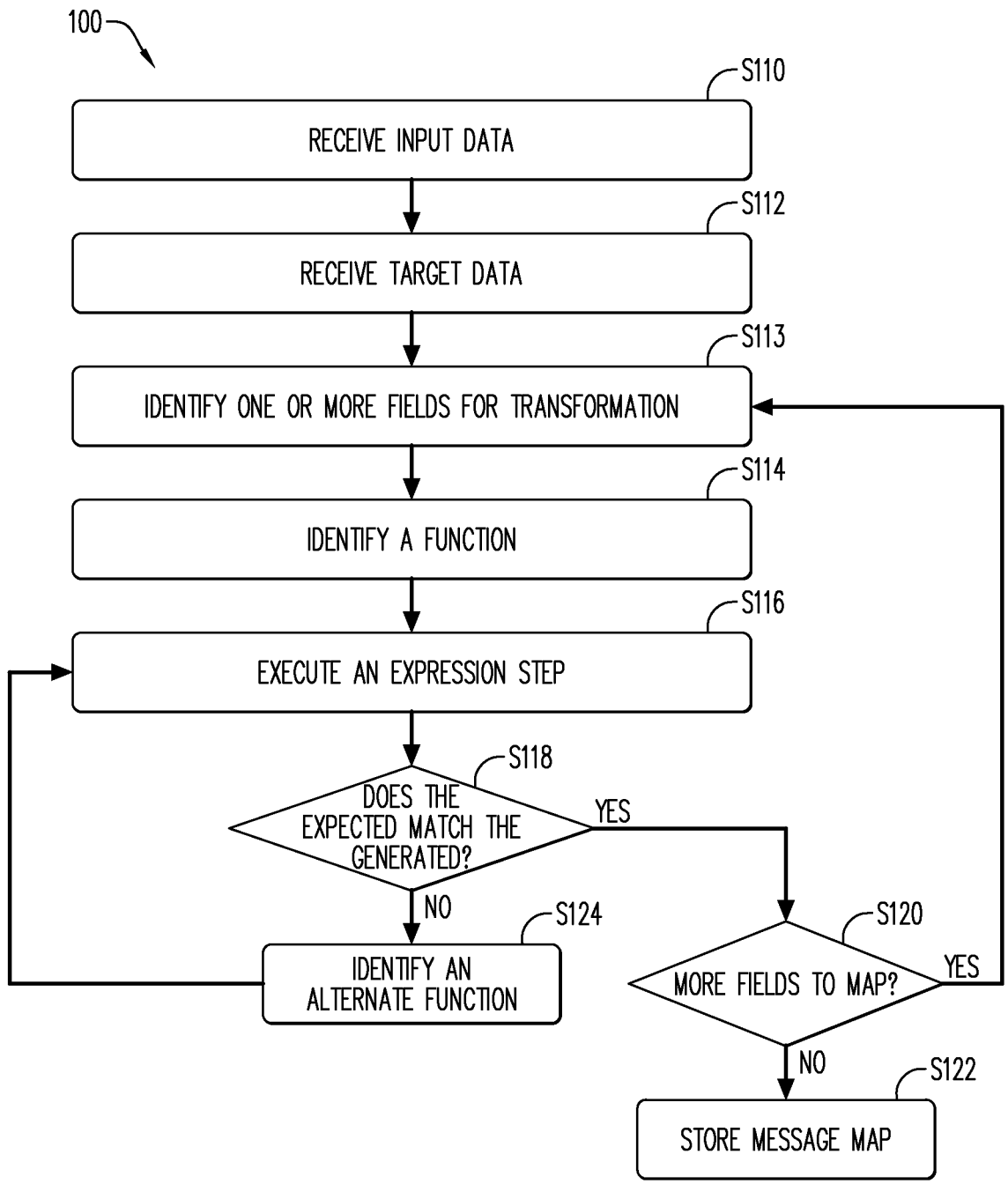
FIG. 1 is a flow diagram according to some embodiments.
Figure 2:
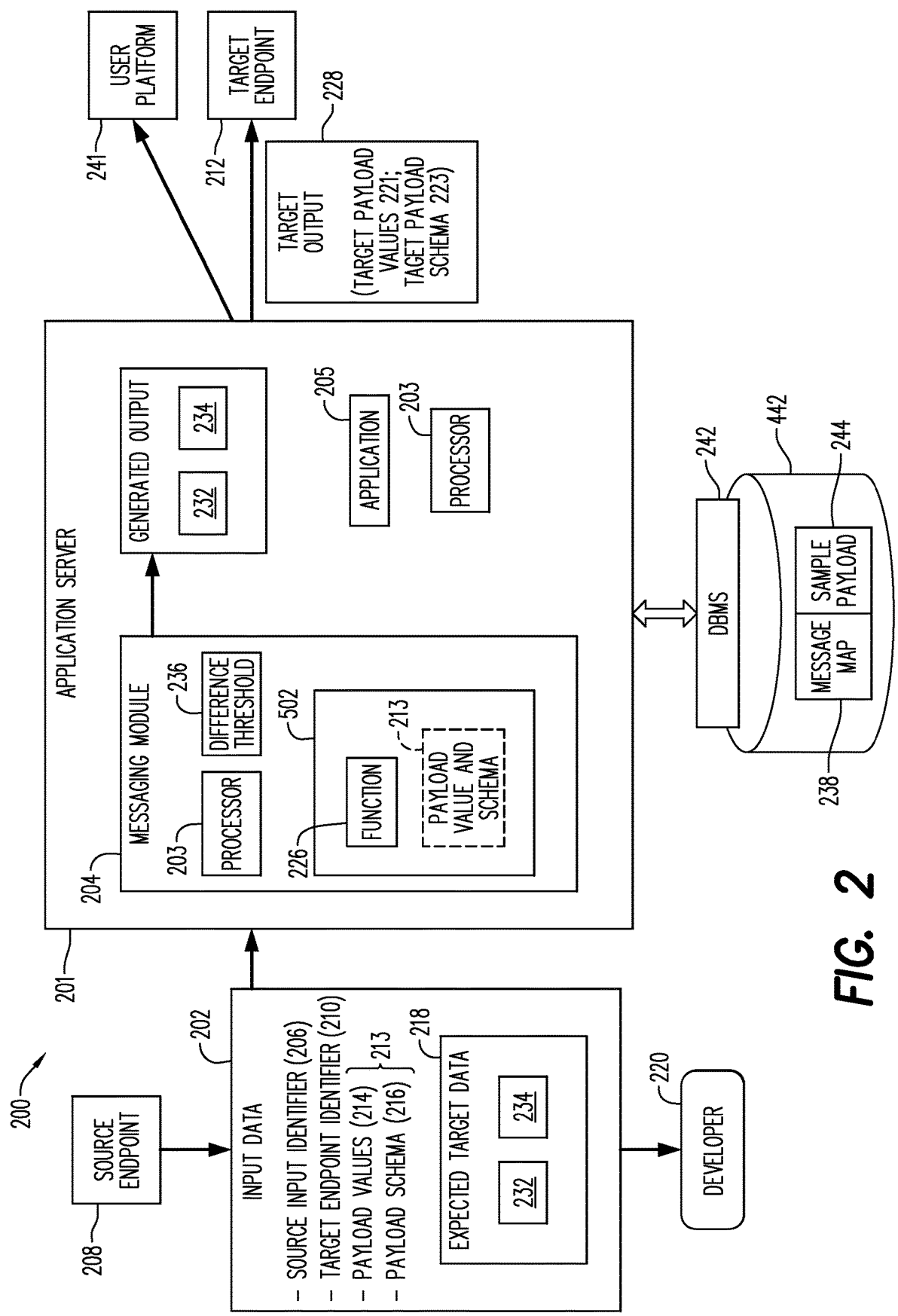
FIG. 2 is a block diagram of a system architecture according to some embodiments.
Figure 3:
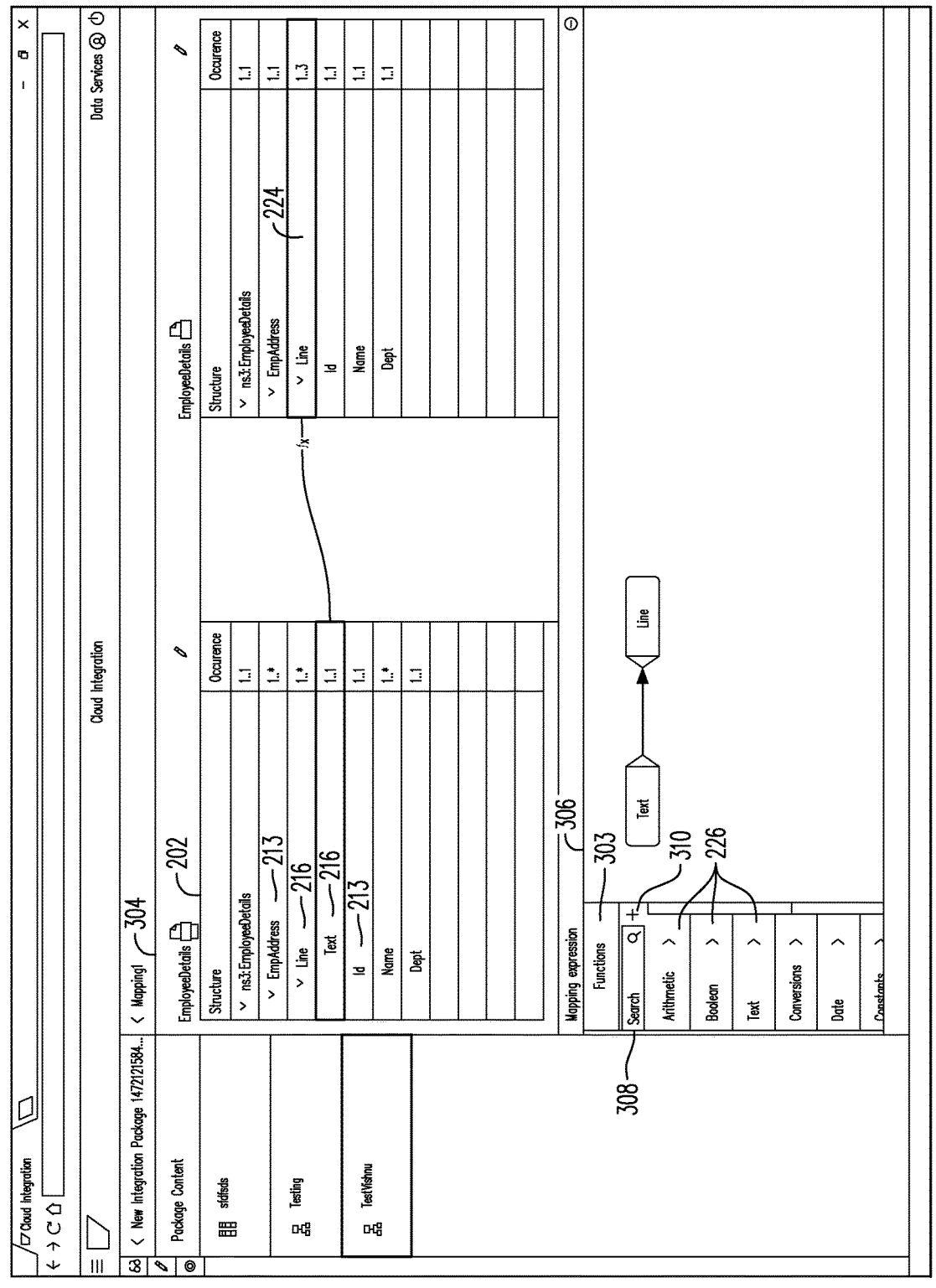
FIG. 3 is a user interface including a non-exhaustive example according to some embodiments.

The following description is provided to enable any person in the art to make and use the described embodiments and sets forth the best mode contemplated for carrying out some embodiments. Various modifications, however, will remain readily apparent to those in the art.

One or more embodiments or elements thereof can be implemented in the form of a computer program product including a non-transitory computer readable storage medium with computer usable program code for performing the method steps indicated herein. Furthermore, one or more embodiments or elements thereof can be implemented in the form of a system (or apparatus) including a memory, and at least one processor that is coupled to the memory and operative to perform exemplary method steps. Yet further, in another aspect, one or more embodiments or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Cloud-based applications, services or resources (collectively referred to as a "cloud-based product") are made available to users on demand via the internet from a cloud computing provider's cloud platform (which includes, for example, the server hardware and operating environment). With cloud platform integration, a cloud web application acts as a single platform where an integration developer may develop integration scenarios and publish them to a public catalog for the synchronization of data and applications between two or more endpoints. Integration may automate complex workflows and reduce or eliminate redundant data that may lead to operational errors. Consequently, cloud integration may improve operational efficiency, flexibility and scalability, as well as reduce operational costs.

As used herein, an integration scenario is a graphical layout showing message flow between systems. The integration scenario may provide a central point of access for all objects used for semantic and technical integration (e.g., interfaces, message mappings and software components) of two or more endpoints. The integration scenario may define the message exchange and message flow for collaborative processes to translate/convert the fields in the source to the target. For the integration scenario, the integration developer may create actions (send and receive) and design the scenario in an integration repository. The integration scenario may typically include information about the source endpoint, target endpoint, and transformation rules to be applied to the message being processed. In one or more embodiments, the message being processed is the data from the data source and the transformation rules to be applied on the payload (/message) provided by the data source). As described above, one of the tools used in the integration scenario is message mapping. As used herein, "message mapping" refers to an activity or step in the integration process that provides a sophisticated graphical tool which enables the integration developer to design their transformation rules between the source and target payload structure.

Conventional message mapping tools provide editors, in-built functions to address common mappings, and the ability to create custom functions where the in-built functions are insufficient. As a non-exhaustive example, an XML payload may be converted from one form to another via the message mapping. In message mapping, the developer typically defines the rules for transforming every single field in the data source to be readable by the target source. The developer may use the in-build functions (e.g., standard functions) or custom functions to facilitate the transformation. However, to make use of the conventional message mapping tools, there may be a high learning curve, where the integration developer ("developer"), may need to understand different concepts (e.g., WL, integration, queue, context, suppress, cardinality handling, duplication, message mappings and a great knowledge on mapping concepts, etc.), and basic functions to implement the mapping. To address these challenges, conventional message mapping tools may provide simulation/testing of the mapping and tracing the mapping. However, as described above, conventional simulation and tracing processes are based on a complete payload (e.g., the translation of an entire data source is completed before the simulation and tracing can be performed). A typical mapping has about 400 fields. Based on the standard transformation rules, the time to complete the mapping may be from five days to several weeks. After designing the message map, if a problem is found, the developer has to correct the problem, and possibly re-design the message map. Additionally, simulation is conventionally only used in testing, but not development, so that the developer is not able to use the simulation during the design process. Conventional tracing processes provide information about every value being converted. Further, with conventional tracing processes, re-execution of a test simulation is required when the developer wants to get information at a different step/activity, which results in the developer losing the context about the previous step. Another challenge with conventional message mapping tools is that the developer is not provided with a complete picture of the context for the message map. For example, with conventional mapping tools the developer does not view the payload (e.g., data values) when generating the message map; the developer only views the structure of the payload ("schema"). The structure of the payload explains the skeleton of the payload, but the actual payload content is missing. Without the complete payload, the developer may make assumptions about the payload while performing the mapping. Frequently, the developer ends up performing a simulation to assess the assumptions. As described above, it takes a long time (e.g., days) for the developer to get the message mapping in a simulate-able state due to the fact that simulation cannot be supported with incomplete message mapping. Instead, the developer may review documentation outside of the messaging tool before creating the message map. Having to look outside the messaging tool may be a cumbersome and time consuming process. It is noted that message mapping requires a large amount of focus to complete a transformation rule. Additionally, the payload structure may be very large (~10000 fields), and the message mapping tool may deploy a lazy loading of them to avoid consumption of unnecessary memory and time. This may be a problem when the developer leaves the tool, as it takes considerable time for the developer to return to the same state after the developer leaves the tool. Then, after the entire message map is complete, the developer may execute a simulation and determine whether the map was successful or a failure.

While developing the message map, the developer may want to determine: 1. Is any source node optional, meaning the source payload may not have an entry; 2. Is the target node mandatory, meaning without this field, the target system may not accept the map; 3. What type of values are used in each expression step; and 4. How quickly may an error be remedied?.

One or more embodiments provide for a mapping module to provide a visualization of both the input and expected output payload in the mapping module itself, without having the user (e.g., developer) exit the module. The mapping module may provide clues/support to the developer during design time when the developer is designing the message map so that the developer may generate the map without assistance from outside the module, circumventing the conventional high learning curve. For example, a developer may not know the fields being transformed, the typical values for these fields, etc. Embodiments provide for the messaging module to provide a visualization of the fields and values during design time (e.g., prior to deployment) so that a complete transformation of the data without finishing the complete message mapping. In this way, while the mapping is being developed, the developer may understand whether the transformation will work or not, thereby avoiding re-works.

As a non-exhaustive example that will be referenced in the application, consider a situation where a group of employees are being moved from one building to another, where a source endpoint is an application including data for the employees (e.g., address, id, name, department, etc.), used while at the first building, and the target endpoint is an application that consumes the data when the employees are in the second building. In the source endpoint (application in this case), each employee's address may be stored as a text entry in several fields (e.g., one field for house number, one field for street, one field for additional information, one field for city, one field for country and one field for zip code). In the target endpoint (application in this case), each employee's address may be a line entry using several different fields. For example, in the target endpoint, the house number and street may be in a single field, and the additional information and city may be in a single field. As such, the employee details for each employee from the source endpoint may not be directly copied to the target endpoint (e.g., the two applications have different fields and different formats), but may be integrated with the employee details in the target endpoint. As described further below, in one or more embodiments, the mapping module may transform the data from the source endpoint, into a format expected and/or receivable by the target endpoint. Continuing with this example, the mapping module may apply a concatenate function to the data from the source endpoint to transform it into the format expected by the target endpoint. It is noted that this non-exhaustive example is relatively simple and related to source and target endpoints having different structures. However, embodiments may be applied to more complex mappings that may also be related to endpoints having different structures, as well as source and target endpoints having different values, or any other suitable differences that may be integrated, as well as endpoints that are note located in physically different locations.

FIGS. 1-6 include a flow diagram of a process 100 (FIG. 1) for updating integrating endpoints 208, 212 (FIG. 2) according to some embodiments. Process 100 may be executed by an application server 201 (FIG. 2) according to some embodiments. In one or more embodiments, the application server 201 may be conditioned to perform the process 100, such that a processor 2303/710 (FIGS. 2/7) of the system 200/700 is a special purpose element configured to perform operations not performable by a general-purpose computer or device.

All processes mentioned herein may be executed by various hardware elements and/or embodied in processor-executable program code read from one or more of non-transitory computer-readable media, such as a hard drive, a floppy disk, a CD-ROM, a DVD-ROM, a Flash drive, Flash memory, a magnetic tape, and solid state Random Access Memory (RAM) or Read Only Memory (ROM) storage units, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Initially, at S110, input data 202 is received at a messaging module 204. The input data 202 may include a source endpoint identifier 206 to identify a source endpoint 208, a target endpoint identifier 210 to identify a target endpoint 212. The input data 202 may also include one or more fields of data ("data field") 213, where each data field 213 includes a payload value 214. For each payload value 214, the data field 213 has an assigned payload schema (i.e., structure) 216. The payload value 214 and payload schema 216 are received from the source endpoint 208. Then in S112, the messaging module 204 may receive expected target data 218, from an integration developer 220 ("developer"). In one or more embodiments the expected target data 218 may be considered input data 202. In one or more embodiments, the expected target data 218 may include one or more data fields 213, wherein each data field 213 includes an expected target payload value 222 associated with a target expected payload schema 224. In one or more embodiments the expected target payload values 222 and expected target payload schema 224 may be values in a format expected by the target endpoint 212.

Next, in S113, the messaging module 204 may identify one or more fields 213 of the input data 202 to map to the fields in the expected target data 218. In one or more embodiments, the identification may be via selection of fields by the developer 220. In one or more embodiments, the identification may be via the similarities between at least one of the source and target field names, values and their location.

Next in S114, at least one function 226 is identified. As used herein, the function 226 is a process that performs an operation, and in particular, an operation to transform the payload values 214 and payload schema 216 from the input data 202 to a target output 228 in a format expected and/or receivable by the target endpoint 212. The function 226 is an entity which works with the actual payload values to arrive at a desired transformation expected at the target endpoint. The target output 228 may include the one or more target payload values 221 and a target payload schema 223 for each target payload value. In one or more embodiments, the target output 228 may match the expected target output 218, and target payload values and schema may match expected target payload values 222 and expected target payload schema 224. In embodiments, the function 226 may be identified from a list 303 (FIG. 3) of standard functions including, but not limited to arithmetic, Boolean, text, conversions, date, concatenation, etc. and/or the function 226 may be identified as a custom (i.e. non-standard) function. In one or more embodiments, identification of the function 226 may be via at least one of the developer 220 and the messaging module 204. In one or more embodiments, identification of the function may be received from the developer 220 via selection on a user interface 300 (FIG. 3), described further below.

In other embodiments, the messaging module 204 may identify the function 226 after analyzing the payload values 214 and payload schema 216 of the input data 202 and the expected target data 218. In one or more embodiments, the analysis may include comparing the payload values 214 and payload schema 216 of the input data 202 to the expected target data 218 and identifying the function 226 best suited to transform the payload values 214 and payload schema 216 of the input data 202 into the expected target payload values 222 and expected target schema 224. In one or more embodiments, a backend (not shown) of the messaging module 204 may have been trained in the operation of the functions in the list 303 of standard functions. The messaging module 204 may apply that training to identify which function 226 may be used to transform the payload values 214 and payload schema 216 in each field 213 of the input data 202 to the fields in the expected target data 218. In one or more embodiments the messaging module 204 may be trained with machine learning modules to understand input and output of the standard functions shipped with mapping. The messaging module 204 may learn the patterns of the standard functions, which may be applied when suggesting transformation(s) for the end user.

After identification of the function 226, the messaging module 204 may execute an expression step 502 (FIG. 5) in S116. As used herein, the expression step 502 may be formed from the payload values 214 and payload schema 216 of the input data 202 and the identified one or more functions 226. In one or more embodiments, execution of the expression step 502 may generate a generated output value 230. The generated output 230 may include one or more generated payload values 232 and corresponding generated schema values 234 for each generated payload value 232.

Then in S118, it is determined whether the generated output 230 matches (or substantially matches) the expected target data 218. In one or more embodiments, the messaging module 204 may compare the generated output 230 to the expected target data 218. In one or more embodiments, the generated output 230 may be considered to match the expected target data 218 when they are exactly the same. Additionally, in one or more embodiments, the generated output 230 may substantially match expected target data 218 (and then be considered "a match"), when the difference between them falls within a pre-determined difference threshold 236 (e.g., value or range of values). In one or more embodiments, the determination of the match may be indicated on the user interface 300 via at least one of color (e.g., green indicates match), text (e.g., an error message) or any other suitable indication.

When it is determined in S118 that the generated output 230 matches the expected target data 218, the process 100 proceeds to S120 and it is determined whether any fields 213 of the input data 202 remain to be mapped to the fields in the expected target data 218. When it is determined in S120 that more fields 213 of payload values 214 and payload schema 216 of the input data 202 remain to be mapped, the process returns to S113 and a next field for mapping is identified. When it is determined in S120 that no more fields 213 of the input data 202 remain to be mapped, the process proceeds to S122 and a message map 238 is stored in a data store 240 and the process ends. As used herein, the message map 238 may be the expression step 502 used to generate the generated output 230 that matches the expected target data 218. In one or more embodiments, when the generated output 230 matches the expected target data 218, the generated output may be output as target output 228. The stored message map 238 may then be published and subsequently deployed to move the values (target output 228) from the source endpoint 208 to the target endpoint 212. In one or more embodiments, the target output 228 may be transmitted to a user platform 241 for review and/or further manipulation by the developer.

When it is determined in S118 that the generated output 230 does not match the expected target data 218, the process 100 proceeds to S124, and an alternate function is identified. In one or more embodiments, when the it is determined there is no direct matching between the generated output and the expected target data, the module looks for a series of functions that may be used to arrive at the expected target data. When there is a series of functions that arrives at the expected target data, this is the alternate function. Based on the findings, if no direct match (with one function or a series of functions) is obtained, the module looks for the nearest match. Then, based on the previous selections, the module orders the suggestions (i.e., alternate functions) for the user. Then the process returns to S116 and the expression step 502 including the alternate function is executed.

Turning to FIGS. 3-6, a non-exhaustive example of the process 100 is provided. In some embodiments, the system 200 may also include a communication channel to supply output (e.g., match or error) from the messaging module 204 to at least one of: developer 220/user platforms 241, target endpoint 212 or of other systems (not shown). In some embodiments, received output from the messaging module 204 may cause modification in the state or condition of the system (e.g., target endpoint). The developer 220 may access the system 200 via one of the user platforms 241 (a control system, a desktop computer, a laptop computer, a personal digital assistant, a tablet, a smartphone, etc.) to view and/or manipulate information related to the message mapping in accordance with any of the embodiments described herein.

Continuing with the non-exhaustive employee-moving scenario described above, a user interface 300 is provided for the developer 220. The user interface 300 may include a mapping section 304 and a mapping expression section 306. In one or more embodiments, the mapping module 204 may provide for the developer 220 to create a message map 238, which may be visualized on the user interface 300.

As described above, in S110, the developer 220 may input the input data 202 to the messaging module 204. The input data 202 may be displayed on the user interface 300 in the mapping section 304. In this example, the mapping module 204 is mapping a structure of the source endpoint to a structure of the target endpoint 212, while in other examples, the mapping module 204 may map values or any other elements between the source endpoint 208 and target endpoint 212. As this example is mapping structures, in FIG. 3, only the payload schema 216 for each of the payload values in a given field 213 is displayed in the mapping section 304. In this non-exhaustive example, the input data 202 includes the data field 213 "EmpAddress", having a payload schema 216 of "line" and "text".

Figure 5:
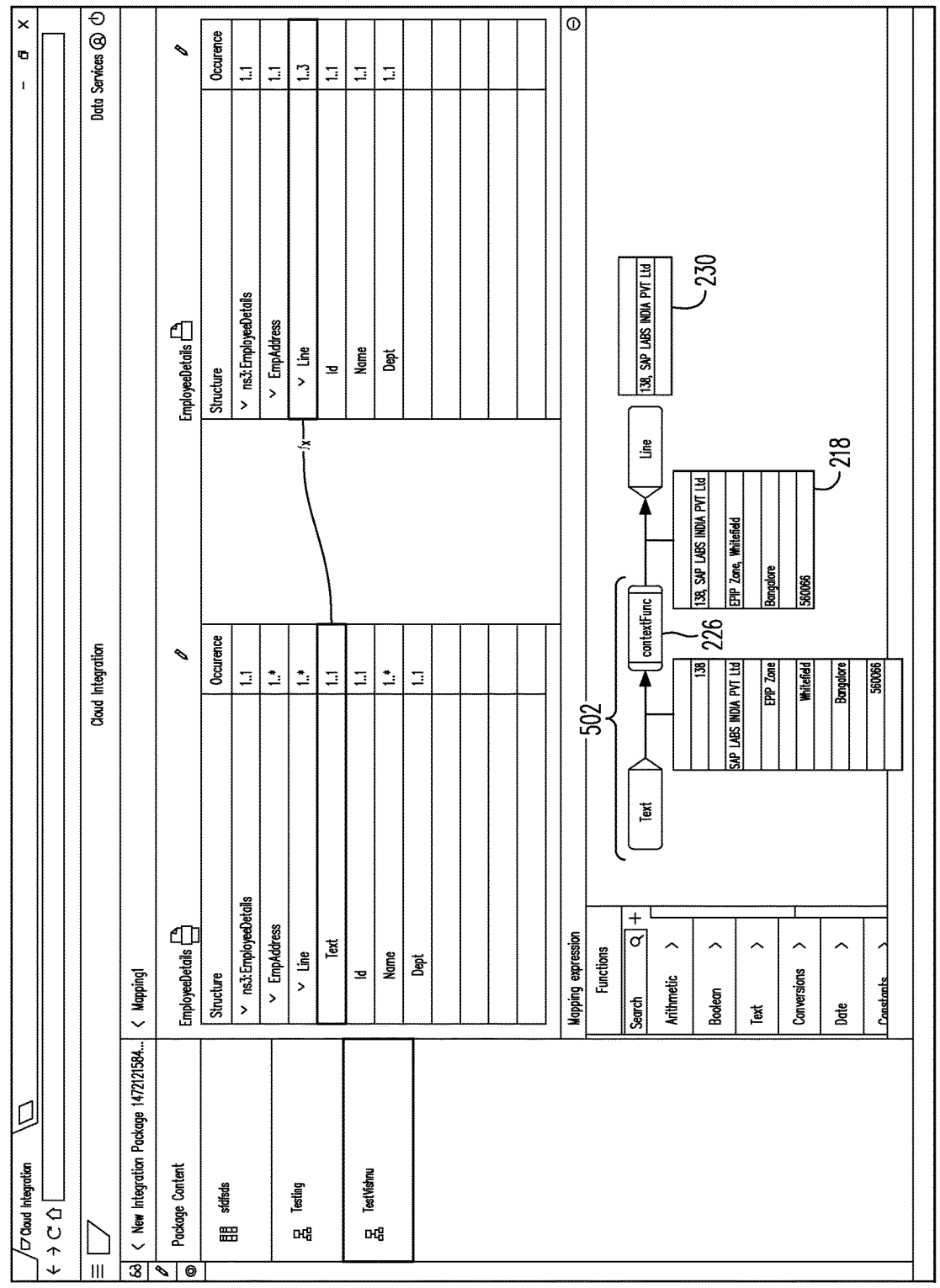
FIG. 5 is a user interface including a non-exhaustive example according to some embodiments.

In one or more embodiments, the mapping expression section 306 may be where the developer 220 or mapping module 204 creates the expression step 502 to transform the input data 202 to the generated output 230. In one or more embodiments, the mapping expression section 306 may provide a visualization 308 of the message map 238 (FIG. 5). As shown in this example, the developer 220 has identified one or more fields for transformation (S113) by adding the text schema 216 from the input data 202 and a line schema from the expected target schema 224 to the mapping expression section 306, to transform the text schema 216 into a line schema 224. The developer 220 may add the schemas (or values, etc.) by any suitable process (e.g., drag-and-drop, selection, etc.). It is noted that in this example, the developer knows to map the text schema 216 from the input data 202 to the line schema from the expected target schema 224. However in some embodiments, the mapping module 204 may suggest which expected target data 218 is suitable for mapping. It is noted that since the module may suggest an expected target data, but not enforce the selection, a dedicated selector (e.g., button) on the user interface may be provided to allow the user to select the suggested target data and a link is then created.

Figure 4:
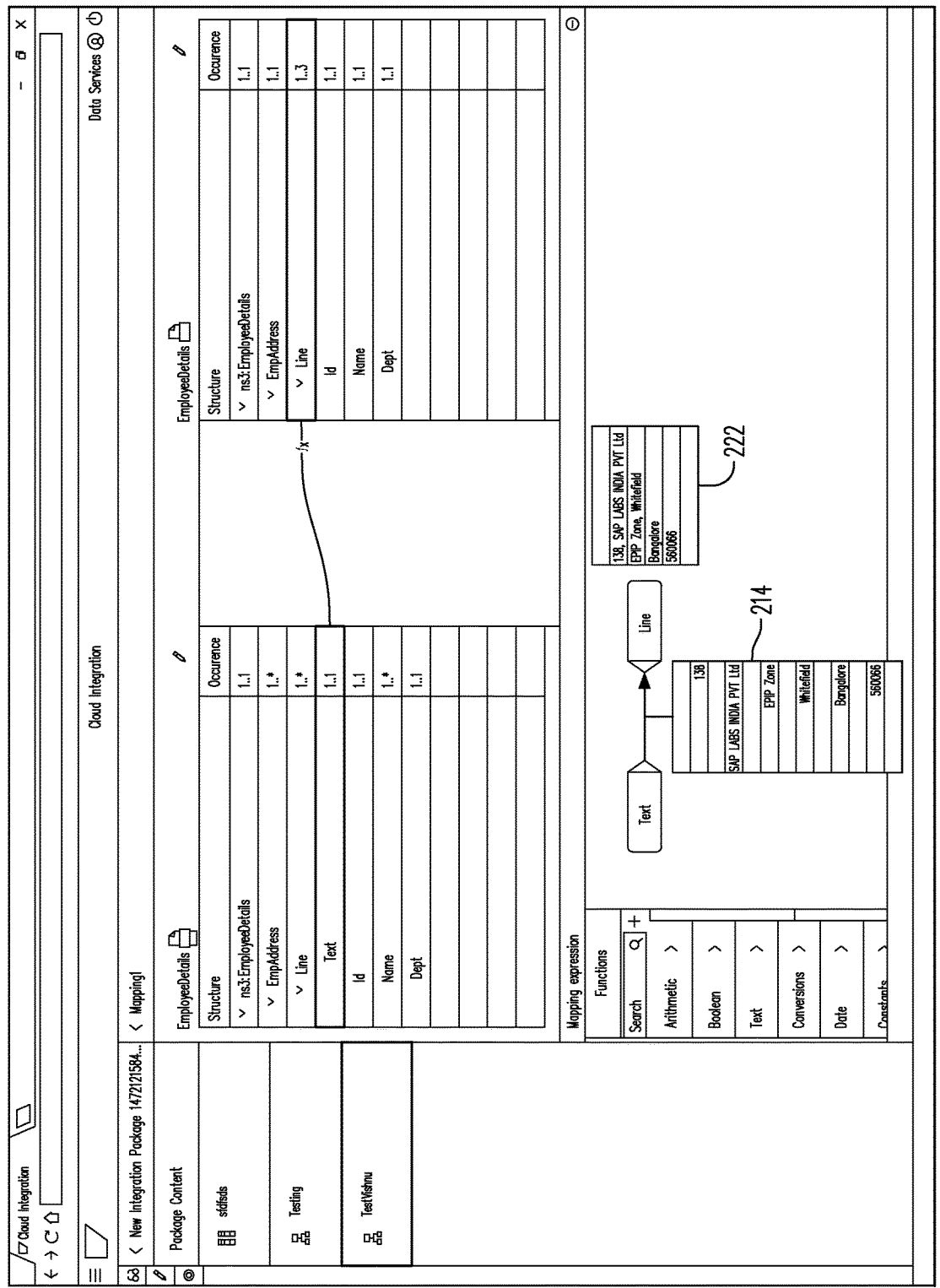
FIG. 4 is a user interface including a non-exhaustive example according to some embodiments.

After the text schema 316 from the input data 202 and the line schema from the expected target structure 224 are added to the mapping expression section 306, the mapping module 204 may display the payload values 214 from the input data 202 associated with the schema 216, and the expected target payload values 222 from the expected target data 218 associated with the expected target schema 224, as shown in FIG. 4. Displaying the payload values for each of the schemas on the mapping expression section 306 allows the developer 202 visualize both the input and expected output payload in the mapping expression section 306 to determine whether the context for which they are creating the message map is appropriate while they are designing the message map. With respect to context, the developer 202 may determine whether the payload values for the fields 213 in the input data 202 are of a same type (e.g., both addresses, or both birth dates, etc.) of value as the expected target payload values 222 from the expected target data 218. The display of the payload values for each of the schemas on the mapping expression section 306 allows the developer 202 to visualize the complete transformation without finishing the complete message mapping and without having to move to another window and/or program.

Then, as described above, in S114, one or more functions to complete the transformation is identified. The mapping expression section 306 may include a list of standard functions 303. As described above, one or more embodiments may also provide for custom functions to be used. The custom functions may be accessed via a search field 308, for example, or may be created via selection of a function creation selector 310, for example. The custom functions may be created and/or accessed via any other suitable process. The identified function 226 is moved to the mapping expression section 306, as shown in FIG. 5. In the example shown herein, the identified function is "context- Func." In one or more embodiments, the "contextFunc" may be a standard function that does not work with single values, and instead works with all values of a field in a given input payload.

It is noted that even when the developer 220 identifies the function 226 on their own, the developer 220 still gets the benefit of testing the mapping immediately.

Figure 6:
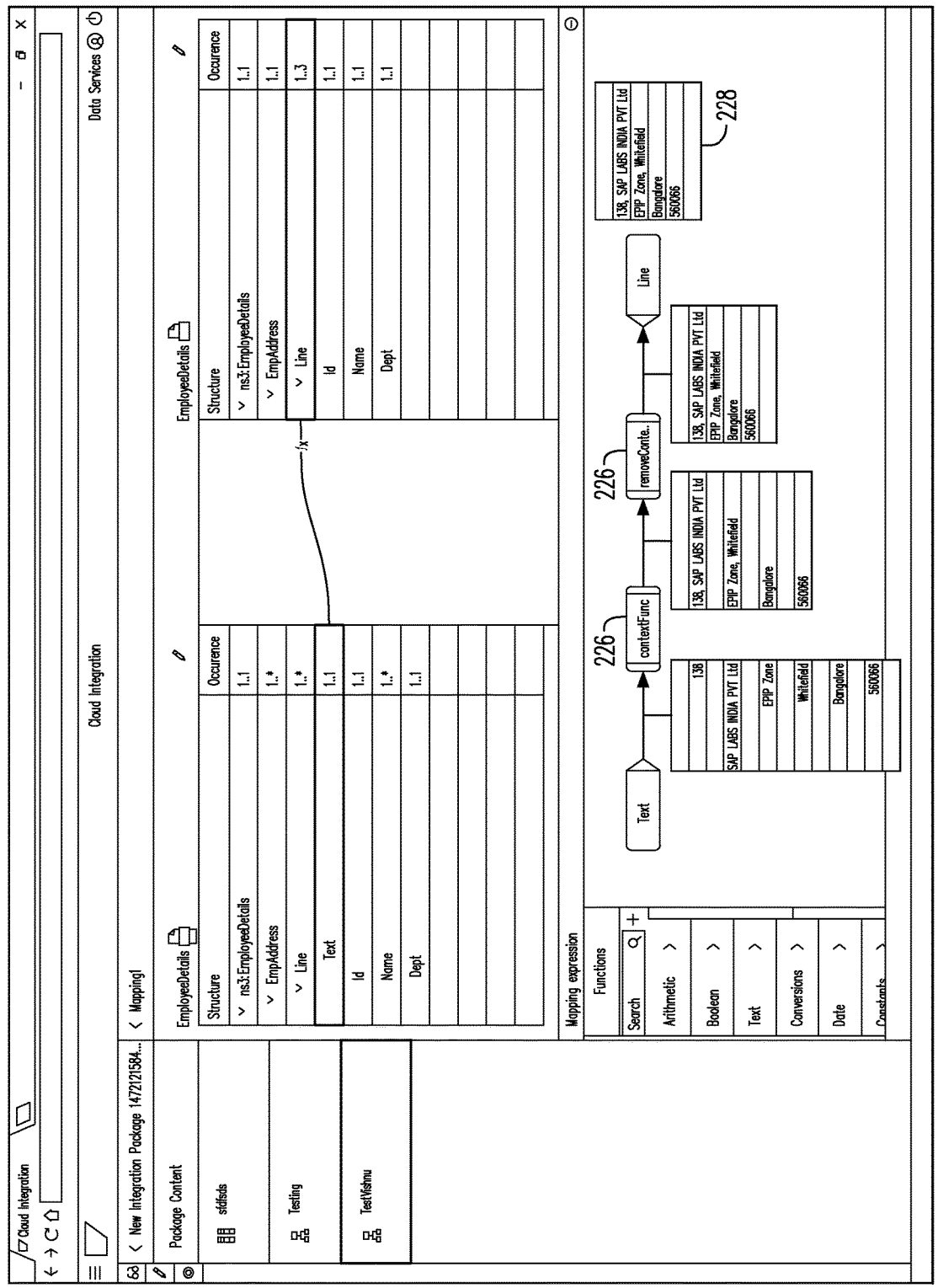
FIG. 6 is a user interface including a non-exhaustive example according to some embodiments.

Next, the expression step is executed, as described above in S116, to generate the generated output 230. In one or more embodiments, this generated output 230 is provided directly in the mapping expression section 306 so that the developer 220 can determine whether the identified function 226 transforms the input data 220 into the expected target data 218. As shown herein, execution of the expression step 502 using the "contextFunc" function 226 generates a generated output 230, that in this case is only the first line of the address (138, SAP LABS INDIA PVT Ltd.), and not the entire address as shown in the expected target data 218. It may then be determined, as described above with respect to S118, that another function may need to be used in addition to, or instead of, the just tested function. Turning to FIG. 6, another function 226 ("removeContexts") was added to the expression step 502, and when the updated expression step (including the input, two functions, and target) is executed the generated output 230 matches the expected target data 218. In this non-exhaustive example, the additional function appends transformation rules per the suggestion.

Turning back to FIG. 2, a block diagram of system architecture 200 according to some embodiments is provided. Embodiments are not limited to architecture 200 or to a three-tier database architecture.

Architecture 200 includes an application server 201, an application 205, a messaging module 204, a source endpoint 208, a target endpoint 212, a developer 220, processor 203, a datastore/database 240 and a database management system or service (DBMS) 22. In one or more embodiments, the messaging module 204 may reside on the application server 201. Applications 205 may comprise server-side executable program code (e.g., compiled code, scripts, etc.) executing within application server 201 to receive queries from clients (e.g., developer, or other systems) and provide results to clients based on data of database 240 per the DBMS 242.

Application server 201 provides any suitable interfaces through which clients may communicate with the messaging module 204 or applications 205 executing on application server 201.

One or more applications 205 executing on server 201 may communicate with DBMS 440 using database management interfaces such as, but not limited to, Open Database Connectivity (ODBC) and Java Database Connectivity (JDBC) interfaces. These types of applications 205 may use Structured Query Language (SQL) to manage and query data stored in database 240.

DBMS 242 serves requests to retrieve and/or modify data of database 240, and also performs administrative and management functions. Such functions may include snapshot and backup management, indexing, optimization, garbage collection, and/or any other database functions that are or become known. DBMS 242 may also provide application logic, such as database procedures and/or calculations, according to some embodiments. This application logic may comprise scripts, functional libraries and/or compiled program code.

Application server 201 may be separated from, or closely integrated with, DBMS 242. A closely-integrated application server 201 may enable execution of server applications completely on the database platform, without the need for an additional application server. For example, according to some embodiments, application server 201 provides a comprehensive set of embedded services which provide end-to-end support for Web-based applications. The services may include a lightweight web server, configurable support for OData, server-side JavaScript execution and access to SQL and SQLScript.

Application server 201 may provide application services (e.g., via functional libraries) which applications 205 may use to manage and query the data of database 240. The application services can be used to expose the database data model, with its tables, hierarchies, views and database procedures, to clients. In addition to exposing the data model, application server 201 may host system services such as a search service.

Database 240 may store data used by at least one of: applications 201 and the messaging module 204. For example, database 240 may store sample payload values 244 to train the messaging module and/or compare an output to. In one or more embodiments, the training may include at least one of the following sub-modules: 1. Structure mapping—how a structure may be transformed to another structure (using similarities between the input and output); 2. Field mappings—how the value of a filed may be converted to the expected one in the target side (e.g., concat, substring, etc.); and 3. Context mappings—how the payload structure of a field may be converted to expected structures (e.g., remote contexts, splitbyValue, etc.). Other suitable sub-modules may be included for training.

Database 240 may comprise any query-responsive data source or sources that are or become known, including but not limited to a structured-query language (SQL) relational database management system. Database 240 may comprise a relational database, a multi-dimensional database, an eXtendable Markup Language (XML) document, or any other data storage system storing structured and/or unstructured data. The data of database 240 may be distributed among several relational databases, dimensional databases, and/or other data sources. Embodiments are not limited to any number or types of data sources.

In some embodiments, the data of database 240 may comprise one or more of conventional tabular data, row-based data, column-based data, and object-based data. Moreover, the data may be indexed and/or selectively replicated in an index to allow fast searching and retrieval thereof. Database 240 may support multi-tenancy to separately support multiple unrelated clients by providing multiple logical database systems which are programmatically isolated from one another.

Database 240 may implement an "in-memory" database, in which a full database is stored in volatile (e.g., non-disk-based) memory (e.g., Random Access Memory). The full database may be persisted in and/or backed up to fixed disks (not shown). Embodiments are not limited to an in-memory implementation. For example, data may be stored in Random Access Memory (e.g., cache memory for storing recently-used data) and one or more fixed disks (e.g., persistent memory for storing their respective portions of the full database).

Figure 7:
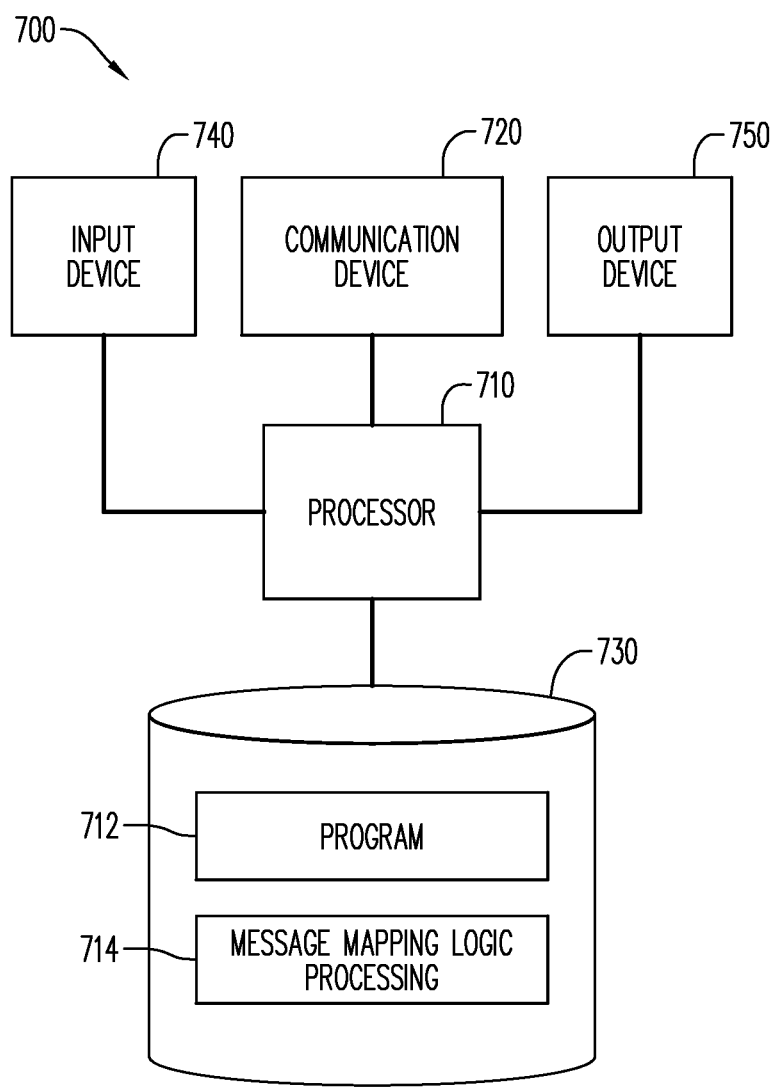
FIG. 7 is a block diagram of a system according to some embodiments.

FIG. 7 is a block diagram of apparatus 700 according to some embodiments. Apparatus 700 may comprise a general- or special-purpose computing apparatus and may execute program code to perform any of the functions described herein. Apparatus 700 may comprise an implementation of one or more elements of system 200. Apparatus 700 may include other unshown elements according to some embodiments.

Apparatus 700 may comprise a general- or special-purpose computing apparatus and may execute program code to perform any of the functions described herein. Apparatus 700 may comprise an implementation of one or more elements of system 200. Apparatus 700 may include other unshown elements according to some embodiments.

Apparatus 700 includes a messaging processor 710 operatively coupled to communication device 720, data storage device 730, one or more input devices 740, one or more output devices 750 and memory 760. Communication device 720 may facilitate communication with external devices, such as application server 201. Input device(s) 740 may comprise, for example, a keyboard, a keypad, a mouse or other pointing device, a microphone, knob or a switch, an infra-red (IR) port, a docking station, and/or a touch screen. Input device(s) 740 may be used, for example, to manipulate graphical user interfaces and to input information into apparatus 700. Output device(s) 750 may comprise, for example, a display (e.g., a display screen) a speaker, and/or a printer.

Data storage device/memory 730 may comprise any device, including combinations of magnetic storage devices (e.g., magnetic tape, hard disk drives and flash memory), optical storage devices, Read Only Memory (ROM) devices, Random Access Memory (RAM) etc.

The storage device 730 stores a program 712 and/or message mapping platform logic 714 for controlling the processor 710. It is noted that program 712 and/or message mapping platform logic 714 may also be stored and executed from an application server or from any other environment (e.g., software architecture) that can execute software instructions. The processor 710 performs instructions of the programs 712, 714, and thereby operates in accordance with any of the embodiments described herein, including but not limited to process 100. The executable instructions of the programs 712, 714 represent the executable instructions of the software architecture, including implementation of the methods, modules, subsystems and components and so forth described herein and may also include memory and/or storage modules . . . etc.

The programs 712, 714 may be stored in a compressed, uncompiled and/or encrypted format. The programs 712, 714 may furthermore include other program elements, such as an operating system, a database management system, and/or device drivers used by the processor 710 to interface with peripheral devices.

The foregoing diagrams represent logical architectures for describing processes according to some embodiments, and actual implementations may include more, or different, components arranged in other manners. Other topologies may be used in conjunction with other embodiments. Moreover, each system described herein may be implemented by any number of computing devices in communication with one another via any number of other public and/or private networks. Two or more of such computing devices may be located remotely from one another and may communicate with one another via any known manner of network(s) and/or a dedicated connection. Each computing device may comprise any number of hardware and/or software elements suitable to provide the functions described herein as well as any other functions. For example, any computing device used in an implementation of system 200 may include a processor to execute program code such that the computing device operates as described herein.

All systems and processes discussed herein may be embodied in program code stored on one or more computer-readable non-transitory media. Such non-transitory media may include, for example, a fixed disk, a floppy disk, a CD-ROM, a DVD-ROM, a Flash drive, magnetic tape, and solid-state RAM or ROM storage units. Embodiments are therefore not limited to any specific combination of hardware and software.

The embodiments described herein are solely for the purpose of illustration. Those in the art will recognize other embodiments may be practiced with modifications and alterations limited only by the claims.

What is claimed is:

1. A system comprising:
   a source endpoint and a target endpoint;
   a mapping module;
   a mapping processor in communication with the mapping module and operative to execute processor-executable process steps to cause the system to:
   receive an input data including one or more payload data values and a payload schema data;
   receive an expected target data, wherein the expected target data includes one or more expected target payload values and one or more expected target schema, wherein the expected target data are in a form receivable by the target endpoint;
   identify one or more fields of payload data values in the input data for transformation;
   identify at least one function to transform the input data into the expected target data, wherein the identified at least one function and input data form an expression step;
   receive the expression step at a first user interface, wherein the expression step is provided as a visualization at the first user interface to visualize a complete transformation before the transformation is complete;
   execute the expression step in the first user interface to generate a generated output in the first user interface;
   determine whether the generated output matches the expected target data; and
   provide an indication of the match to at least one of the user interface and another system.

2. The system of claim 1, wherein the input data includes a source endpoint identifier and a target endpoint identifier.

3. The system of claim 1, wherein the payload schema data includes a structure for each payload data value in the input data.

4. The system of claim 1, wherein execution of the expression step is in a design environment.

5. The system of claim 1 wherein the received at least one function is operative to transform one or more fields of input data into a single field of the expected target data.

6. The system of claim 1, wherein the at least one function is received for each field of payload data values.

7. The system of claim 6, further comprising processor-executable process steps to cause the system to:
   execute the expression step for each field to generate the generated output;
   determine whether each generated output matches the expected target data corresponding to a respective payload data value;
   provide an indication of each match to at least one of a user interface and another system; and
   generate a message map including one or more expression steps corresponding to the matched indications.

8. The system of claim 1, wherein the function is received from one of a user and the mapping module.

9. The system of claim 8, wherein the mapping module provides the function by:

comparing one or more values in the payload data values to a corresponding value in the expected target data;

determining at least one function operative to transform the one or more fields in the input data to the corresponding field in the expected target data, wherein the at least one function is selected for use in the determination from a pre-defined list of functions; and providing the at least one function.

10. The system of claim 7, further comprising processor-executing process steps to cause the system to:

publish the message map.

11. A method comprising:

receiving an input data including one or more payload data values and a payload schema data;

receiving an expected target data, wherein the expected target data includes one or more expected target payload values and one or more expected target schema, wherein the expected target data are in a form receivable by the target endpoint;

identifying one or more fields of payload data values in the input data for transformation;

identifying at least one function to transform the input data into the expected target data, wherein the identified at least one function and input data form an expression step;

receiving the expression step at a first user interface, wherein the expression step is provided as a visualization at the first user interface to visualize a complete transformation before the transformation is complete;

executing, at the first user interface, the expression step to generate a generated output, wherein execution of the expression step is in a design environment;

determining whether the generated output matches the expected target data; and providing an indication of the match to at least one of the user interface and another system.

12. The method of claim 11, wherein the payload schema data includes a structure for each payload data value in the input data.

13. The method of claim 11, further comprising:

executing the expression step for each field to generate the generated output;

determining whether each generated output matches the expected target data corresponding to a respective payload data value;

providing an indication of each match to at least one of the user interface and another system; and generating a message map including one or more expression steps corresponding to the matched indications.

14. A non-transitory computer-readable medium storing program instructions executed by a processor of a computer system having memory, the medium comprising instructions for causing the processor to perform:

receiving an input data including one or more payload data values and a payload schema data;

receiving an expected target data, wherein the expected target data includes one or more expected target payload values and one or more expected target schema, wherein the expected target data are in a form receivable by the target endpoint;

identifying one or more fields of payload data values in the input data for transformation;

identifying at least one function to transform the input data into the expected target data, wherein the identified at least one function and input data form an expression step;

receiving the expression step at a first user interface, wherein the expression step is provided as a visualization at the first user interface to visualize a complete transformation before the transformation is complete;

executing, at the first user interface, the expression step to generate a generated output;

determining whether the generated output matches the expected target data; and providing an indication of the match to at least one of the user interface and another system.

15. The medium of claim 14, wherein execution of the expression step is in a design environment.

16. The medium of claim 14, further comprising instructions for causing the processor to perform:

executing the expression step for each field to generate the generated output;

determining whether each generated output matches the expected target data corresponding to a respective payload data value;

providing an indication of each match to at least one of the user interface and another system; and generating a message map including one or more expression steps corresponding to the matched indications.

17. The medium of claim 14, wherein the payload schema data includes a structure for each payload data value in the input data.

18. The medium of claim 14, wherein the function is received from one of a user and a mapping module.

* * * * *